United States Patent [19]
Koenig et al.

[11] 3,832,389
[45] Aug. 27, 1974

[54] SUBSTITUTED CHLOROCARBONYLUREA

[75] Inventors: Karl-Heinz Koenig, Frankenthal; Rudolf Kolbinger, Speyer; Bernd Zeeh, Ludwigshafen; Adolf Fischer, Mutterstadt, all of Germany

[73] Assignee: Badische Anilin- & Soda-Fabrik Aktiengesellschaft, Ludwigshafen/Rhine, Germany

[22] Filed: Mar. 17, 1972

[21] Appl. No.: 235,656

[52] U.S. Cl. .................. 260/479 C, 71/90, 71/105, 71/106, 71/111, 71/115, 260/305, 260/465 D, 260/468 E, 260/471 C, 260/544 C
[51] Int. Cl. .......................................... C07c 127/18
[58] Field of Search .................. 260/544 C, 479 C

[56] References Cited
UNITED STATES PATENTS

| | | | |
|---|---|---|---|
| 3,565,901 | 2/1971 | Balo | 260/299 |
| 3,579,500 | 5/1971 | Jelinek | 260/544 C |
| 3,705,188 | 12/1972 | Singer | 260/544 Y |

*Primary Examiner*—Lorraine A. Weinberger
*Assistant Examiner*—Richard D. Kelly
*Attorney, Agent, or Firm*—Johnston, Keil, Thompson & Shurtleff

[57] ABSTRACT

New and valuable substituted chlorocarbonylureas having good herbicidal properties and a process for controlling the growth of unwanted plants with these compounds.

1 Claim, No Drawings

SUBSTITUTED CHLOROCARBONYLUREA

The present invention relates to new and valuable substituted chlorocarbonylureas; a process for producing them; herbicides containing these compounds as active ingredients; and the use of these compounds as herbicides.

It is known to use N-p-chlorophenyl-N',N'-dimethylurea as a herbicidal active ingredient. However, its action is unsatisfactory.

We have now found that new and substituted chlorocarbonylureas of the formula

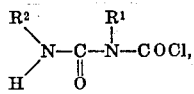

where $R^1$ denotes alkyl of one to four carbon atoms ($CH_3$, $C_2H_5$, iso-$C_3H_7$, n-$C_4H_9$, tert-$C_4H_9$) or methoxyalkyl and $R^2$ denotes a radical of the formulae

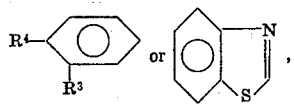

$R^3$ denoting hydrogen, hydroxyl, halogen (fluorine, chlorine, bromine, iodine), lower alkyl ($C_1$-$C_2$), lower alkoxy of one to three carbon atoms, lower thioalkyl of one to three carbon atoms, haloalkyl (trifluoromethyl), methylsulfonyl, cyano, N,N-dimethylamidosulfonyl or 4'-chlorophenoxyl, and $R^4$ having the same meanings as $R^3$, $R^3$ further denoting alkylcarbamoyloxy of the formula

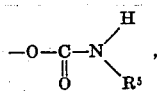

$R^5$ denoting linear or branched alkyl, alkenyl or alkynyl having a maximum of nine carbon atoms which may be substituted by chlorine, bromine, benzyl, phenyl, cyclohexyl, -S-cyclohexyl, norbonyl, lower ($C_1$-$C_3$) alkoxy or alkylthio, have a good herbicidal action. Preferred meanings of $R^5$ are branched alkyl radicals.

$R^5$ may for example denote:
β-methoxyethyl, β-ethoxyethyl, γ-methoxypropyl, γ-chloropropyl, (α-chloromethyl)-propyl, α,α-dimethyl-β-chloroethyl, α,α-dimethyl-β-bromoethyl, α,α,α-tris-(chloromethyl)-methyl, α,α-bis-(chloromethyl)-ethyl, α,α-bis-(chloromethyl)-propyl, α-chloromethylethyl, butyn-(1)-yl-(3), methyl-(3)-butyn-(1)-yl-(3), methyl-(3)-pentyn-(1)-yl-(3), methyl-(3)-buten-(1)-yl-(3), methyl-(3)-penten-(1)-yl-(3), α,α-dimethyl-(β-methylthio)-ethyl, α,α-dimethyl-(β-methoxy)-ethyl, α,α-dimethyl-(β-ethylthio)-ethyl, α-(methylthiomethyl)-propyl, α-(methoxymethyl)-propyl, α-(methylthiomethyl)-ethyl, α-(methoxymethyl)-ethyl, α,α-dimethylbenzyl, 3-phenyl-3-methylpropyn-(1)-yl-(3), α-methyl-α-(trichloromethyl)-ethyl, methyl, ethyl, isopropyl, tert-butyl, 3-methylbutyl-(2), 4-methylpentyl-(3), butyl-(2), α,α-dimethylcyclohexyl and pentyl-(3).

The good herbicidal action of the new compounds is particularly in evidence at application rates of 1 to 5 kg of active ingredient per hectare. The new compounds are suitable for use in cereals, Indian corn, cotton, soya beans and cane sugar.

The new substituted chlorocarbonylureas may be prepared as follows:

A solution of the urea (1 mole) in tetrahydrofuran is placed in a vessel and, at room termperature, a solution of phosgene (1.8 moles) in ethylene chloride is dripped in. The reaction mixture is stirred at elevated temperature and then the solvent is evaporated off. The residue may be crystallized from benzene, cyclohexane, ligroin, ethyl acetate or mixtures thereof.

EXAMPLE 1

198.5 parts by weight of N-methyl-N'-(3-chloro-4-methylphenyl)-urea is dissolved in 800 parts of tetrahydrofuran. At room temperature a solution of 180 parts of phosgene in 500 parts of ethylene chloride is added. The reaction mixture is stirred overnight at room temperature and then heated for 4 hours at from 50° to 60°C and the solvent is subsequently evaporated off. The residue is recrystallized from a mixture of ligroin and ethyl acetate. The yield is 204 parts of N-3-chloro-4-methylphenyl-N'-methyl-N'-chlorocarbonylurea, which melts at 100° to 102°C.

The following compounds may be obtained analogously:

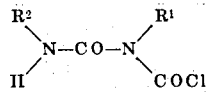

| $R^1$ | $R^2$ | M.P. (° C.) |
|---|---|---|
| —$CH_3$ | -⟨O⟩-F | 90–94 |
| —$CH_3$ | -⟨O⟩-Br | 121–124 |
| —$CH_3$ | -⟨O⟩-Br (Cl) | 114–118 |
| —$CH_3$ | -⟨O⟩-O-C(=O)-NH-C($CH_3$)($CH_3$)-$CH_3$ | 127–129 |

| R¹ | R² | M.P. (° C.) |
|---|---|---|
| —CH₃ | 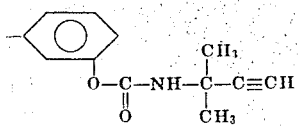 | 122–124 |
| —CH₃ | 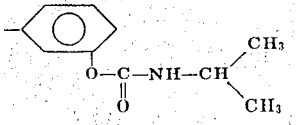 | 143–144 |
| —CH₃ |  | 205–210 |
| —CH₃ | 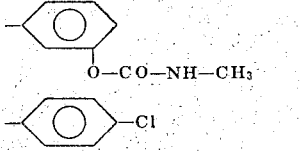 | 123–128 |
| —CH₃ |  | 112–113 |
| —CH₃ | 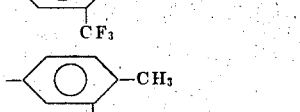 | 54–56 |
| —CH₃ | 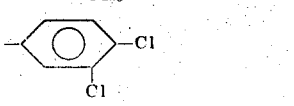 | 63–67 |
| —CH₃ | 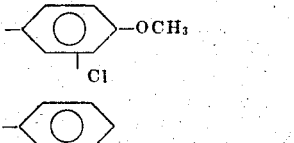 | 75–77 |
| —CH₃ | 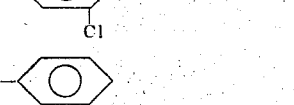 | 121–123 |
| —CH₃ | 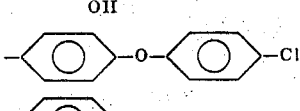 | 112–114 |
| —CH₃ | 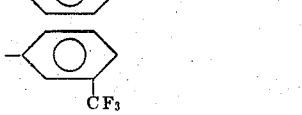 | 97–99 |
| —CH₃ | 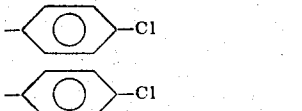 | 142–144 |
| —CH₃ | 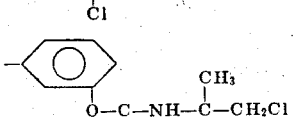 | 116–121 |
| —C₂H₅ | 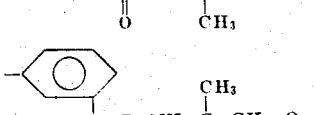 | 102–105 |
| —C₂H₅ |  | 41–50 |
| —CH₃—O—(CH₂)₃— | 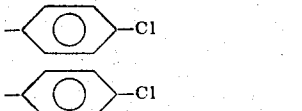 | 89–92 |
| —CH₃—O—(CH₂)₃— | 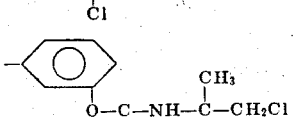 | 74–76 |
| —CH₃ | 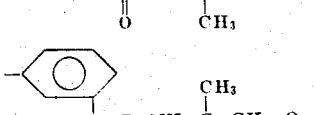 | -------- |
| —CH₃ |  | -------- |

—Continued
| R¹ | R² | M.P. (° C.) |
|---|---|---|
| —CH₃ | 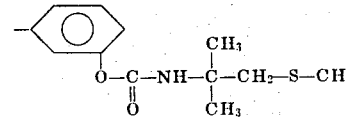 | |
| —CH₃ | 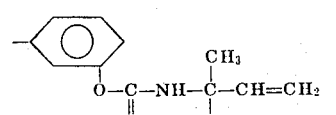 | |
| —CH₃ | 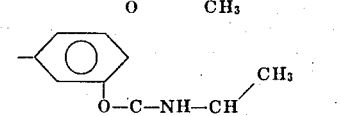 | |
| —CH₃ | 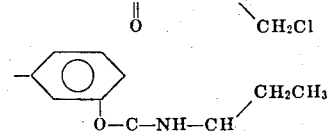 | |
| —CH₃ | 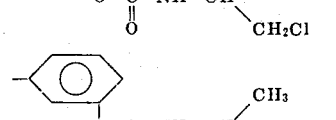 | |
| —CH₃ | 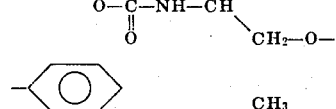 | |
| —CH₃ | 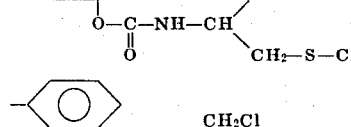 | |
| —CH₃ | 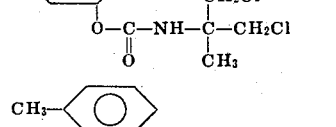 | |
| —CH₃ |  | |
| —CH₃ | 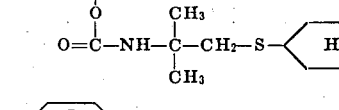 | |
| —CH₃ | 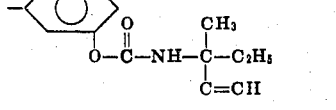 | |
| —CH₃ | 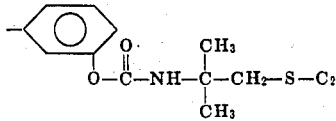 | |
| —CH₃ | 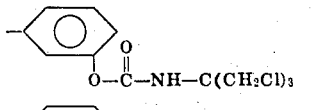 | |
| —CH₃ | 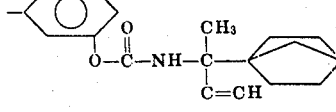 | |
| —CH₃ | 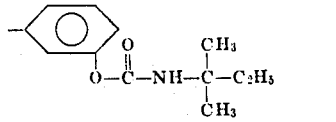 | |

— Continued

| R¹ | R² | M.P. (°C.) |
|---|---|---|
| —CH₃ | —O—C₆H₄—O—C(=O)—NH—CH(CH₃)—CH(CH₃)₂ | —— |
| —CH₃ | —O—C₆H₄—O—C(=O)—NH—C(C₂H₅)(C₂H₅)—C≡CH | —— |
| —CH₃ | —O—C₆H₄—O—C(=O)—NH—C(CH₃)(C₆H₅)—C≡CH | —— |
| —CH₃ | —O—C₆H₄—O—C(=O)—NH—C(CH₃)(CH₃)—CH₂—C₆H₅ | —— |

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150°C, e.g. tetrahydronaphthalene or alkylated naphthalenes, or organic liquids having boiling points higher than 150°C and having one or more than one functional group, e.g., the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

EXAMPLE 2

On an agricultural plot the plants Triticum aestivum, Zea mays, Gossypium hirsutum, Poa annua, Poa trivialis, Echinochloa crus-galli, Chenopodium album and Lamium amplexicaule were treated at a growth height of 3 to 15 cm with 1.5 kg per hectare of each of the following active ingredients, each amount being dispersed in 500 liters of water per hectare:

I  CH₃—N(COCl)—CO—NH—C₆H₄—F

II  CH₃—N(COCl)—CO—NH—C₆H₄—Br

III  CH₃—N(COCl)—CO—NH—C₆H₃(Cl)—Br

IV  N-p-chlorophenyl-N',N'-dimethylurea (comparative agent).

After 3 to 4 weeks it was ascertained that active ingredients I to III had, compared with compound IV, superior crop plant compatibility and the same good herbicidal action.

The results are given below:

| | Active ingredient | | | |
|---|---|---|---|---|
| | I | II | III | IV |
| Triticum aestivum | 10 | 10 | 5 | 45 |
| Zea mays | 5 | 5 | 5 | 30 |
| Gossypium hirsutum | 5 | 5 | 10 | 30 |
| Poa annua | 80 | 85 | 90 | 85 |
| Poa trivialis | 80 | 80 | 80 | 80 |
| Echinochloa crus-galli | 75 | 80 | 75 | 80 |
| Chenopodium album | 95 | 95 | 100 | 95 |
| Lamium amplexicaule | 95 | 95 | 95 | 95 |

0 = no damage
100 = complete destruction

The action of the following compounds corresponds to that of I to III above:

CH₃—N(COCl)—CO—NH—C₆H₄—O—C(=O)—NH—C(CH₃)(CH₃)—CH₃ benzothiazol-2-yl—NH—CO—N(COCl)—CH₃

CH₃—N(COCl)—CO—NH—C₆H₄—O—C(=O)—NH—C(CH₃)(CH₃)—C≡CH

CH₃—N(COCl)—CO—NH—C₆H₃(Cl)—CH₃

CH₃—N(COCl)—CO—NH—C₆H₄—O—C(=O)—NH—CH(CH₂—S—CH₃)(CH₃)

CH₃—N(COCl)—CO—NH—C₆H₃(Cl)—Cl

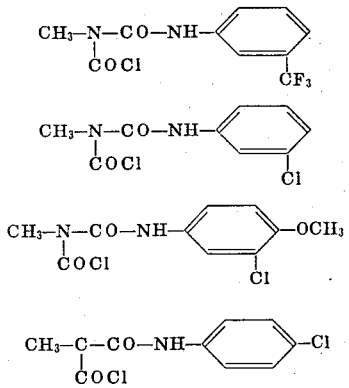

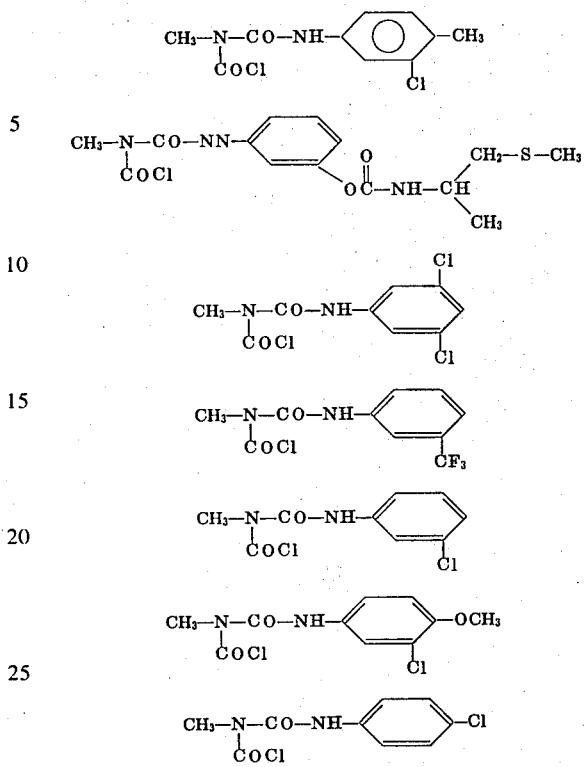

EXAMPLE 3

In a greenhouse loamy sandy soil was filled into pots and sown with Saccharum officinarum, Gossypium hirsutum, Soja hispida, Poa annua, Poa trivialis, Echinochloa crus-galli, Sinapis arvensis and Chenopodium album. The soil prepared in this manner was then treated with 1 kg per hectare of

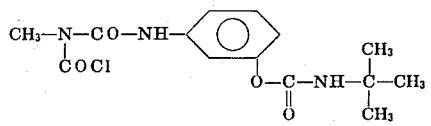

and, for comparison, with 1 kg per hectare of
II 1-(m-tert-butylcarbamoyloxyphenyl)-3',3-dimethylurea, each active ingredient being dispersed in 500 liters of water per hectare.

After 4 to 5 weeks it was acertained that I had, compared with II, superior crop plant compatibility and the same good herbicidal action. The results are given below:

|  | Active ingredient | |
|---|---|---|
|  | I | II |
| Saccharum officinarum | 0 | 5 |
| Gossypium hirsutum | 10 | 45 |
| Soja hispida | 10 | 40 |
| Poa annua | 100 | 95 |
| Poa trivialis | 100 | 100 |
| Echinochloa crus-galli | 95 | 95 |
| Sinapis arvensis | 100 | 100 |
| Chenopodium album | 100 | 100 |

0 = no damage
100 = complete destruction

The action of the following compounds corresponds to that of I above:

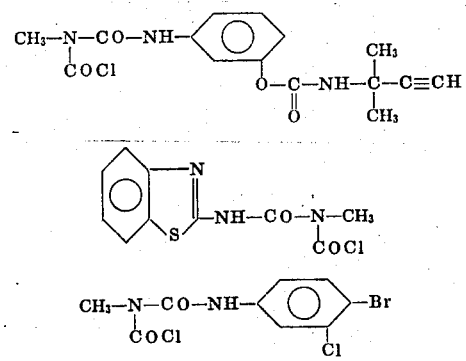

EXAMPLE 4

Waste land with Raphanus raphanistrum, Vicia villosa, Convolvulus arvensis, Galeopsis tetrahit, Cyperus esculentus, Echinochloa crus-galli, Digitaria sanguinalis, Cynodon dactylon, Lolium perenne, Alopecurus myosuroides and Agropyron repens growing on it was treated at a growth height of the plants of 10 to 30 cm with 4 kg per hectare of each of the following active ingredients, each being dispersed in 500 liters of water per hectare:

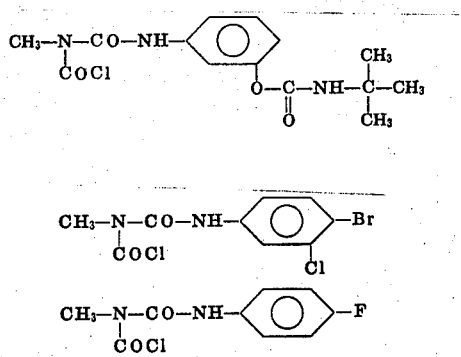

After 3 weeks the broadleaved and grassy weeds were completely withered.

EXAMPLE 5

Experimental plots were sown with Chenopodium album, Sinapis arvensis, Cyperus esculentus, Echinochloa crus-galli, Lolium multiflorum, Dactylis glomerata and Setaria viridis. The plots were subsequently treated with 4 kg per hectare of each of the following active ingredients, each being dispersed in 500 liters of water per hectare:

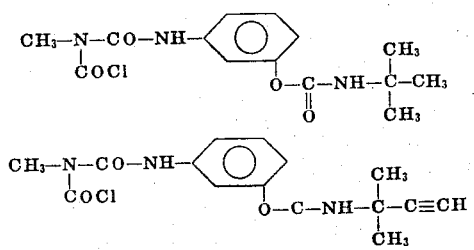

After 5 weeks it was ascertained that the plants were completely withered.

EXAMPLE 6

90 parts by weight of compound I from Example 2 is mixed with 10 parts by weight of N-methyl-α-pyrrolidone. A mixture is obtained which is suitable for application in the form of very fine drops.

EXAMPLE 7

20 parts by weight of compound II from Example 2 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 8

20 parts by weight of compound III from Example 2 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 9

20 parts by weight of compound I from Example 3 is dissolved in a mixture consisting of 25 parts by weight of cyclohexanol, 65 parts by weight of a mineral oil fraction having a boiling point between 210°C and 280°C, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 10

20 parts by weight of compound I from Example 2 is well mixed with 3 parts by weight of the sodium salt of diisobutylnaphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1 percent by weight of the active ingredient.

EXAMPLE 11

3 parts by weight of compound II from Example 2 is intimately mixed with 97 parts by weight of particulate kaolin. A dust is obtained containing 3 percent by weight of the active ingredient.

EXAMPLE 12

30 parts by weight of compound III from Example 2 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:
1. N-methyl-N-chlorocarbonyl-N'-3-(α,α-dimethylpropargylcarbamoyloxyphenyl)-urea.

* * * * *

UNITED STATES PATENT AND TRADEMARK OFFICE
CERTIFICATE OF CORRECTION

PATENT NO. : 3,832,389

DATED : August 27, 1974

INVENTOR(S) : Karl-Heinz Koenig, Rudolf Kolbinger, Bernd Zeeh & Adolf Fischer

It is certified that error appears in the above-identified patent and that said Letters Patent are hereby corrected as shown below:

Insert in the heading--[30] Foreign Application Priority Data, March 29, 1971, Germany, P 21 15 096.9--.

Signed and Sealed this ninth Day of December 1975

[SEAL]

Attest:

RUTH C. MASON
*Attesting Officer*

C. MARSHALL DANN
*Commissioner of Patents and Trademarks*